United States Patent [19]

Kawashima et al.

[11] 3,723,875

[45] Mar. 27, 1973

[54] MULTILEVEL DIGITAL SIGNAL TRANSMISSION SYSTEM

[75] Inventors: Masao Kawashima, Yokohama-shi; Mikio Ohtsuki, Kawasaki-shi; Isao Fudemoto, Machida-shi; Kiyoshi Tomimori, Kawasaki-shi, all of Japan

[73] Assignee: Fujitsu Limited, Kawasaki-shi, Japan

[22] Filed: Mar. 3, 1969

[21] Appl. No.: 803,680

[30] Foreign Application Priority Data

Mar. 9, 1968 Japan ................................43/15293

[52] U.S. Cl. ..................................325/13, 325/38 R

[51] Int. Cl. ............................H04b 7/18, H04b 1/00

[58] Field of Search ....325/13, 38 R, 141, 321, 38 A; 178/70, 68; 179/15 AC, 15 AR; 328/164; 340/347 DD

[56] References Cited

UNITED STATES PATENTS

| | | | |
|---|---|---|---|
| 3,518,662 | 6/1970 | Nakagome | 340/347 |
| 3,509,279 | 4/1970 | Martin | 325/326 X |
| 3,414,677 | 12/1968 | Quinlan | 179/15.55 |
| 3,424,982 | 1/1969 | Kawashima | 325/13 |
| 3,452,297 | 6/1969 | Kelly | 332/9 |
| 3,500,247 | 3/1970 | Sekimoto | 332/11 |
| 3,462,687 | 8/1969 | Becker | 325/42 |

*Primary Examiner*—Robert L. Griffin
*Assistant Examiner*—Barry L. Leibowitz
*Attorney*—Curt M. Avery, Arthur E. Wilfond, Herbert L. Lerner and Daniel J. Tick

[57] ABSTRACT

Multilevel digital signals are converted to binary signals and are transmitted as such. The binary signals are integrated by the frequency characteristic of a transmission line of narrow bandwidth. The transmission line converts the binary pulses to a multilevel signal. The receiver receives the transmitted multilevel signal and converts it to analog signals.

6 Claims, 11 Drawing Figures

Patented March 27, 1973

3,723,875

10 Sheets-Sheet 4

Patented March 27, 1973 3,723,875

10 Sheets-Sheet 6

Patented March 27, 1973 3,723,875

10 Sheets-Sheet 9

Patented March 27, 1973 3,723,875

10 Sheets-Sheet 10

MULTILEVEL DIGITAL SIGNAL TRANSMISSION SYSTEM

DESCRIPTION OF THE INVENTION:

The present invention relates to a system for transmitting multilevel digital signals as binary pulse signals. More particularly, the invention relates to a PCM system for transmitting multilevel digital signals having a level above ternary as binary pulse signals.

In code transmission, the required bandwidth of a relay transmission line necessary for transmitting the required information is proportional to the number of time slots which must be transmitted within a specific period of time. If a sufficient signal-to-noise ratio may be obtained in the transmission line, the higher the level of the transmission code of information, the less the number of time slots may be reduced, and accordingly the less the required transmission band may be reduced. On the other hand, in a conventional system, signals are transmitted by encoding at a lower level such as, for example, binary or ternary, in a high class transmission medium having a sufficient signal-to-noise ratio. A suitable high class transmission medium is a coaxial transmission line. A consequence is that the speed of transmission is unnecessarily increased and the required transmission band is enlarged, so that line loss in the transmission maximum frequency is unnecessarily increased and the distances between repeaters are shortened. This results in considerably higher costs for the production and maintenance of the system.

In order to solve the aforedescribed problems, a multilevel code transmission system has been provided which utilizes a high class transmission medium having a high initial signal-to-noise ratio, as aforedescribed, and permitting the reduction of the required transmission bandwidth and the increase of the distances between repeaters. This results in an increase in the information capacity which may be transmitted. In order to provide such multilevel code transmission, however, the transmitter must be provided with equipment for providing a plurality of digital levels, and repeaters are required in order to regenerate said digital levels. For this purpose, a pulse power source is required for generating the digital levels independently from each other or a pulse power source is required for generating the highest level and an attenuator is utilized to decrease the signal level to the other levels. If a plurality of pulse power sources are utilized, the system becomes complicated and costly in manufacture and operation, and if an attenuator is utilized, electrical power is consumed unnecessarily and considerable heat is radiated. Although these deficiencies do not considerably affect a transmitter at a terminal station, they are fatal in a regenerative repeater.

The principal object of the present invention is to provide a system for transmitting multilevel digital signals having a level above ternary as bipolar pulse signals.

An object of the present invention is to provide a system for transmitting multilevel digital signals as bipolar pulse signals, which system is of low cost in production and operation.

An object of the present invention is to provide a system for transmitting multilevel digital signals as bipolar pulse signals, which system functions with efficiency, effectiveness and reliability.

In accordance with the present invention, a system for transmitting multilevel digital signals having a level above ternary via a transmission line for converting bipolar pulses to a multilevel signal, comprises a converter for converting the multilevel digital signals into bipolar or unipolar pulses of a number corresponding to the level and converting the waveform of the pulses into a group of series pulses of pulse code waveform. An input connected to the converter supplies the multilevel digital pulse to the converter. A transmitter coupled to the converter transmits the group of series pulses in one time slot of the digital signals as bipolar pulse groups. A receiver receives the transmitted signals as a multilevel signal in one time slot.

The word "bipolar" is defined herein as a group of bipolar series pulses constituted by the pulses 1 and −1. The word "unipolar" is defined herein as a group of unipolar series pulses constituted by the pulses 1 or −1.

A regenerative repeater for regenerating digital signals comprises an equalizer for equalizing and amplifying digital signals. An input connected to the equalizer supplies digital signals to the equalizer. A detector coupled to the equalizer comprises a plurality of detectors for detecting the levels of the equalized and amplified signals. A converter coupled to the detector converts the detected signals into a group of bipolar PCM codes. An output connected to the converter derives the group of bipolar PCM codes.

A regenerative repeater for regenerating digital signals comprises an equalizer for equalizing and amplifying digital signals. An input connected to the equalizer supplies digital signals to the equalizer. A reference voltage source provides a reference voltage having a reference level. A comparator connected to the equalizer and the reference voltage source compares the levels of the reference voltage and the equalized and amplified digital signals. The comparator provides a single pulse in accordance with the comparison. A coupling connected between the comparator and the reference voltage source modifies the magnitude of the reference level in accordance with the pulse.

The principle of the present invention, as described, is that unipolar or bipolar pulses, or pulses resulting from the conversion of the waveforms of unipolar or bipolar pulses, and waveforms which may be provided with relative facility, are transmitted in a single time slot. The waveforms are equalized by the transmission line and equalizers in the receiver such as, for example, in the repeaters. Thus, for example, the amplitude of the group of series pulses in a single time slot may be integrated and the width of half levels of the group may be provided at approximately a single time slot. The pulses are effectively received at the waveform detecting points of the repeaters as multilevel codes, so that multilevel code information is received at the receiver. This system is similar to the conventional multilevel system in that, as aforedescribed, the half level width of the equalized waveform is nearly equal to a single time slot and the necessary transmission band of the system of the present invention is therefore equal to that of the conventional system.

In order that the present invention may be readily carried into effect it will now be described with reference to the accompanying drawings, wherein.

Figures 1, 1A:
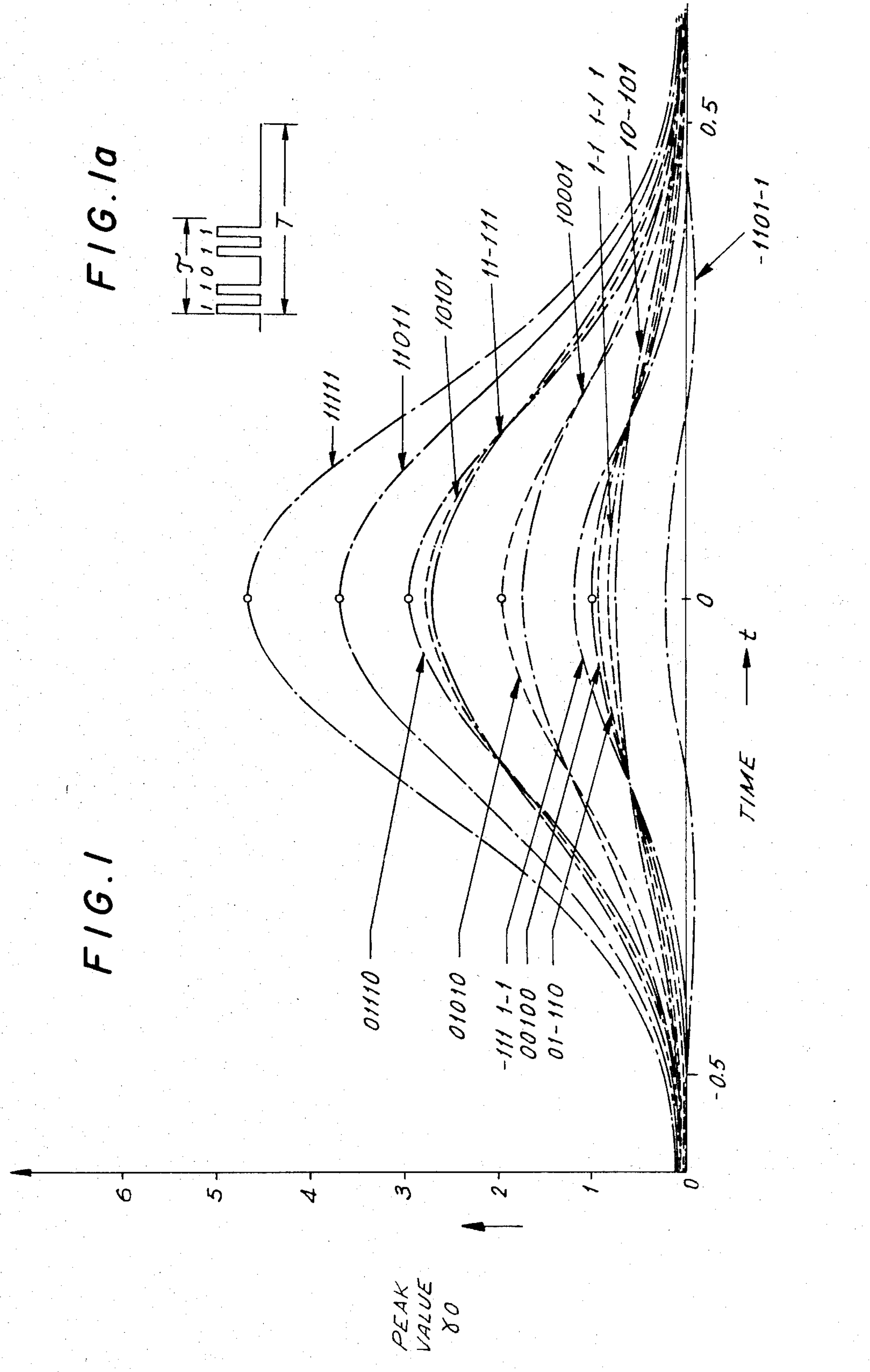
FIG. 1 is a graphical presentation of a plurality of curves for illustrating the principle of operation of the present invention.
FIG. 1a is an illustration of the magnitudes T and $\tau$.

FIG. 1 illustrates a six level or hexanary transmission and is an example of symmetrical and positive total equalized waveforms of 13 types of a total number of 35 codes of a pulse train. The pulse train comprises pulses of five bits as equalized waveforms compared to a transmitted pulse of a single bit. In FIG. 1, the abscissa indicates the time $t$ and the ordinate indicates the peak value $\gamma 0$ of the equalized waveform.

If the duration of a single time slot is T, and the width of the time slot occupied by the transmitted pulses is $\tau$, $\tau/T$ is selected as 0.5 and the pulse length and frequency characteristics of the system of the present invention and the transmission line are selected so that the half level width of the equalized waveform of a single transmitted pulse becomes 0.45 of the time slot.

As shown in FIG. 1, six levels may be expressed by the number of pulses with an error of under approximately 8 percent at the center of the time slot. This indicates that the multilevel signal is of sufficiently high quality. In accordance with the present invention, the receiver detects multilevel codes and the corresponding group of series codes, as aforedescribed, are regenerated and transmitted.

Figure 2:
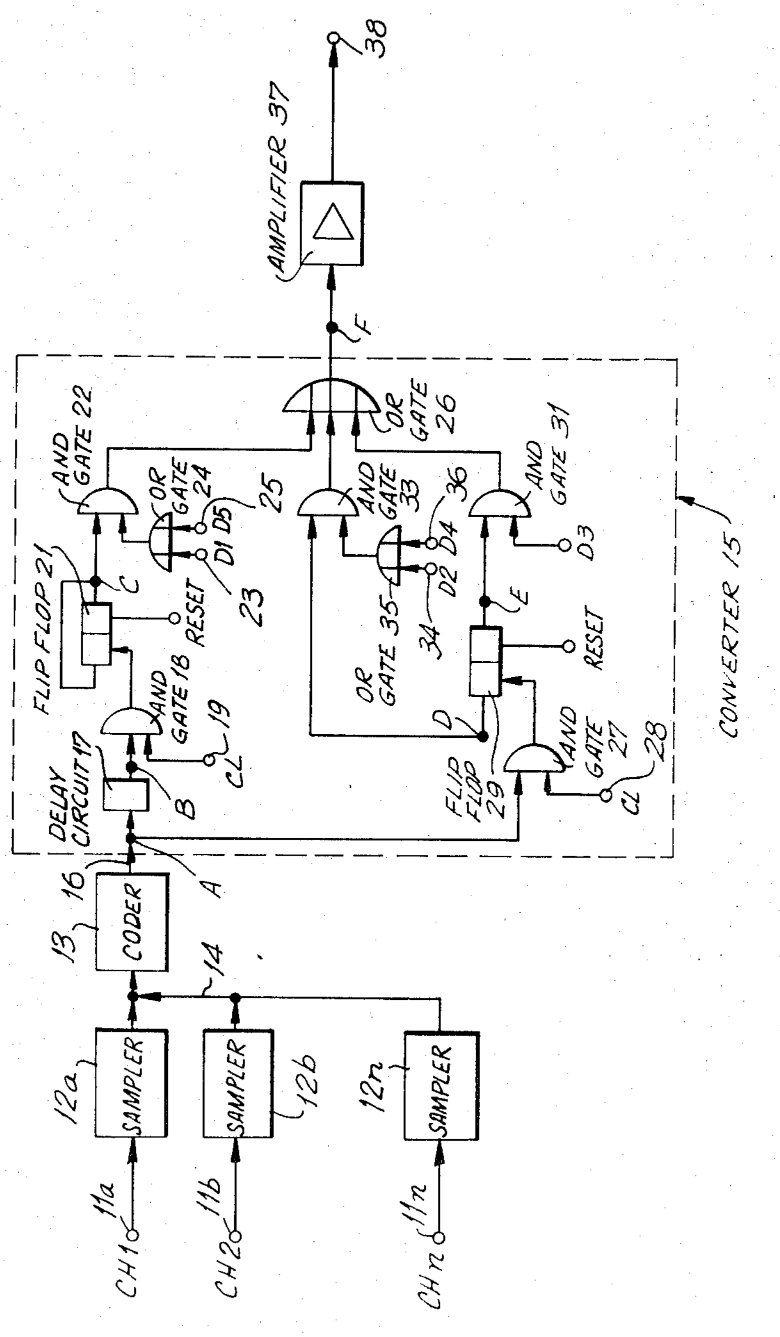
FIG. 2 is a block and circuit diagram of an embodiment of a transmitter of the system of the present invention.

FIG. 2 is an embodiment of a transmitter or a transmitter terminal station of the system of the present invention. The transmitter of FIG. 2 utilizes four level or quaternary codes. Audio signals supplied via input terminals 11$a$, 11$b$, . . . 11$n$ are provided in channels 1, 2, . . . $n$. The audio signals are sampled by corresponding samplers 12$a$, 12$b$, . . . 12$n$. The samplers 12$a$, 12$b$, . . . 12$n$ are connected in common to an input of a coder 13 via a lead 14.

The coder 13 converts the audio signals into PAM pulses and multiplexes said pulses and converts said pulses into bipolar PCM pulses. This operation is the same as the usual PCM communications system operation and the components utilized may be those known in the art. The bipolar PCM pulses are then converted into a group of bipolar pulses representing multilevel digital signals by a converter 15. The output of the coder 13 is connected to the input of the converter 15 via a lead 16.

In accordance with the principle of operation of the present invention, the bipolar PCM pulses are first converted into multilevel PCM pulses in the converter 15, and the multilevel PCM pulses are then converted into a group of bipolar pulses in said converter. In the actual circuit, however, the bipolar PCM pulses are simply converted into a group of bipolar pulses.

Figure 3:
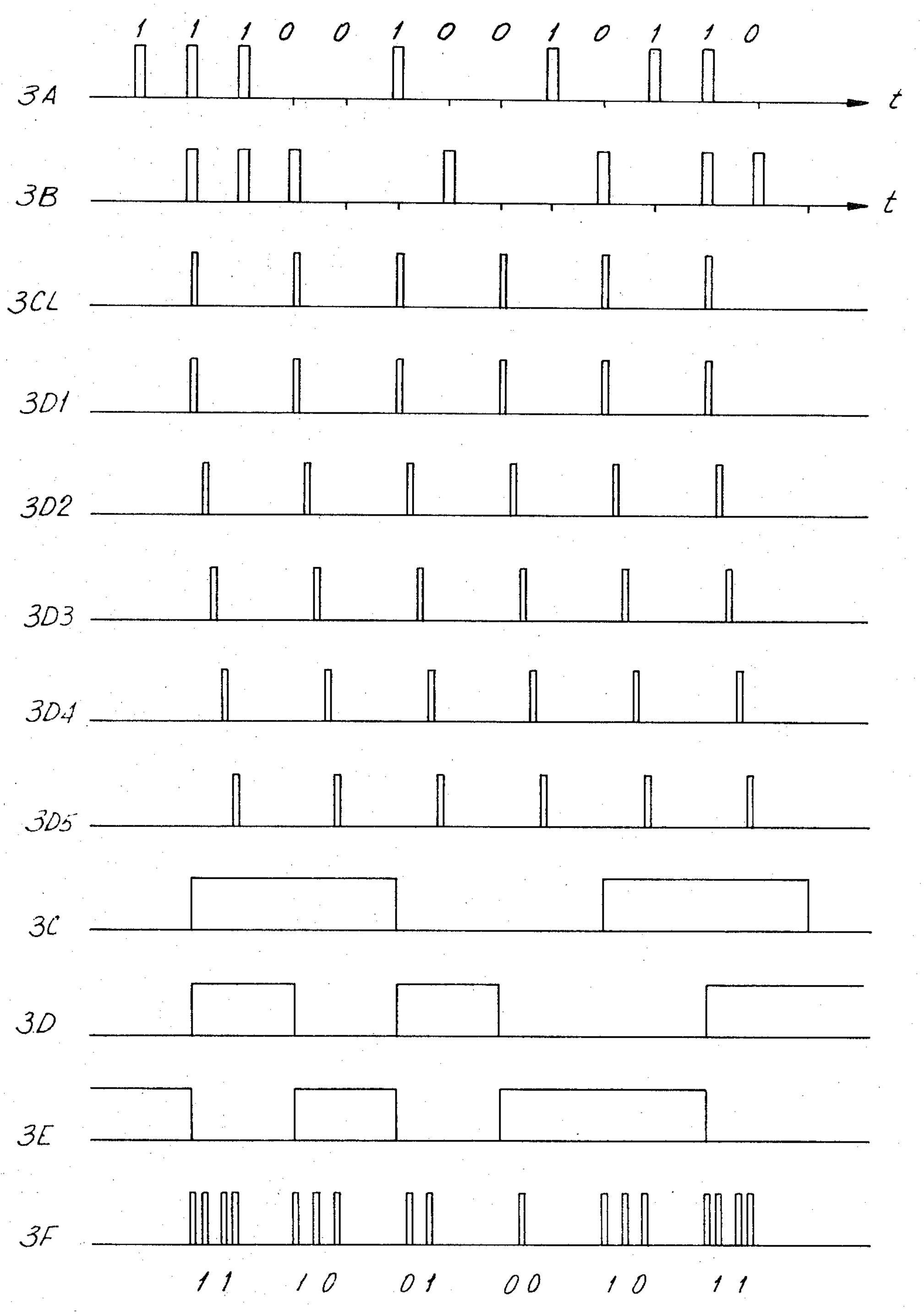
FIG. 3 is a graphical presentation of the waveforms appearing in the circuit of FIG. 2.

The operation of the transmitter of FIG. 2 is explained with reference to the waveforms of FIG. 3. FIG. 3 comprises a plurality of waveforms 3A, 3B, 3CL, 3D1, 3D2, 3D3, 3D4, 3D5, 3C, 3D, 3E and 3F. The waveform 3A of FIG. 3 is the PCM pulses provided at the output of the coder 13 of FIG. 2. The PCM pulses of waveform 3A are supplied to a two level-four level-two level or binary-quaternary-binary pulse group converter circuit comprising a delay circuit 17, which provides a delay of one bit, and a plurality of logical components.

In the converter 15 of FIG. 2, the output of the delay circuit 17 is connected to an input of an AND gate 18. An input terminal 19 is connected to the other input of the AND gate 18. The output of the AND gate 18 is connected to an input of a flip flop 21. The output of the flip flop 21 is connected to an input of an AND gate 22. An input terminal 23 is connected to an input of an OR gate 24 and an input terminal 25 is connected to the other input of said OR gate. The output of the OR gate 24 is connected to the other input of the AND gate 22. The output of the AND gate 22 is connected to an input of an OR gate 26.

The output of the coder 13 is connected in common to the input of the delay circuit 17 and to an input of an AND gate 27. An input terminal 28 is connected to the other input of the AND gate 27. The output of the AND gate 27 is connected to the input of a flip flop 29. An output of the flip flop 29 is connected to an input of an AND gate 31. An input terminal 32 is connected to the other input of the AND gate 31. The other output of the flip flop 29 is connected to an input of an AND gate 33. An input terminal 34 is connected to an input of an OR gate 35 and an input 36 is connected to the other input of said OR gate. The output of the OR gate 35 is connected to the other input of the AND gate 33.

The output of the AND gate 31 is connected to another input of the OR gate 26. The output of the AND gate 33 is connected to the third input of the OR gate 26. The output of the OR gate 26 is connected to the input of an amplifier 37. An output terminal 38 is connected to the output of the amplifier 37.

The waveforms 3A, 3B, 3C, 3D, 3E and 3F of FIG. 3 appear at the points A, B, C, D, E and F in FIG. 2. The waveform 3CL of FIG. 3 is the clock pulses which are supplied to the input terminals 19 and 28 of FIG. 2. The waveforms 3D1, 3D2, 3D3, 3D4 and 3D5 of FIG. 3 are the digital pulses supplied to the input terminals 23, 34, 32, 36 and 25, respectively. The PCM pulses of the waveform 3A of FIG. 3 are supplied to the input of the AND gate 27 as well as to the input of the AND gate 18. The difference is that the waveform 3A is supplied to the AND gate 18 via the delay circuit 17.

The AND gates 18 and 27 supply the PCM pulses of the waveform 3A of FIG. 3 to the corresponding flip flops 21 and 29 under the control of the clock pulses CL, as shown in the waveform 3CL of FIG. 3. The flip flop 21 produces the waveform 3C and the flip flop 29 produces the waveforms 3D and 3E of FIG. 3. The waveform 3F is provided by controlling the waveforms 3C, 3D and 3E by digit pulses.

In the described embodiment of the system of the present invention, PCM pulses 1,1 are converted into four pulses, PCM pulses 1,0 are converted into three pulses, PCM pulses 0,1 are converted into two pulses, and PCM pulses 0,0 are converted into one pulse. The pulse train converted into the pulse group in the aforedescribed manner, is provided at the output terminal 38 after amplification by the amplifier 37.

Figure 4:
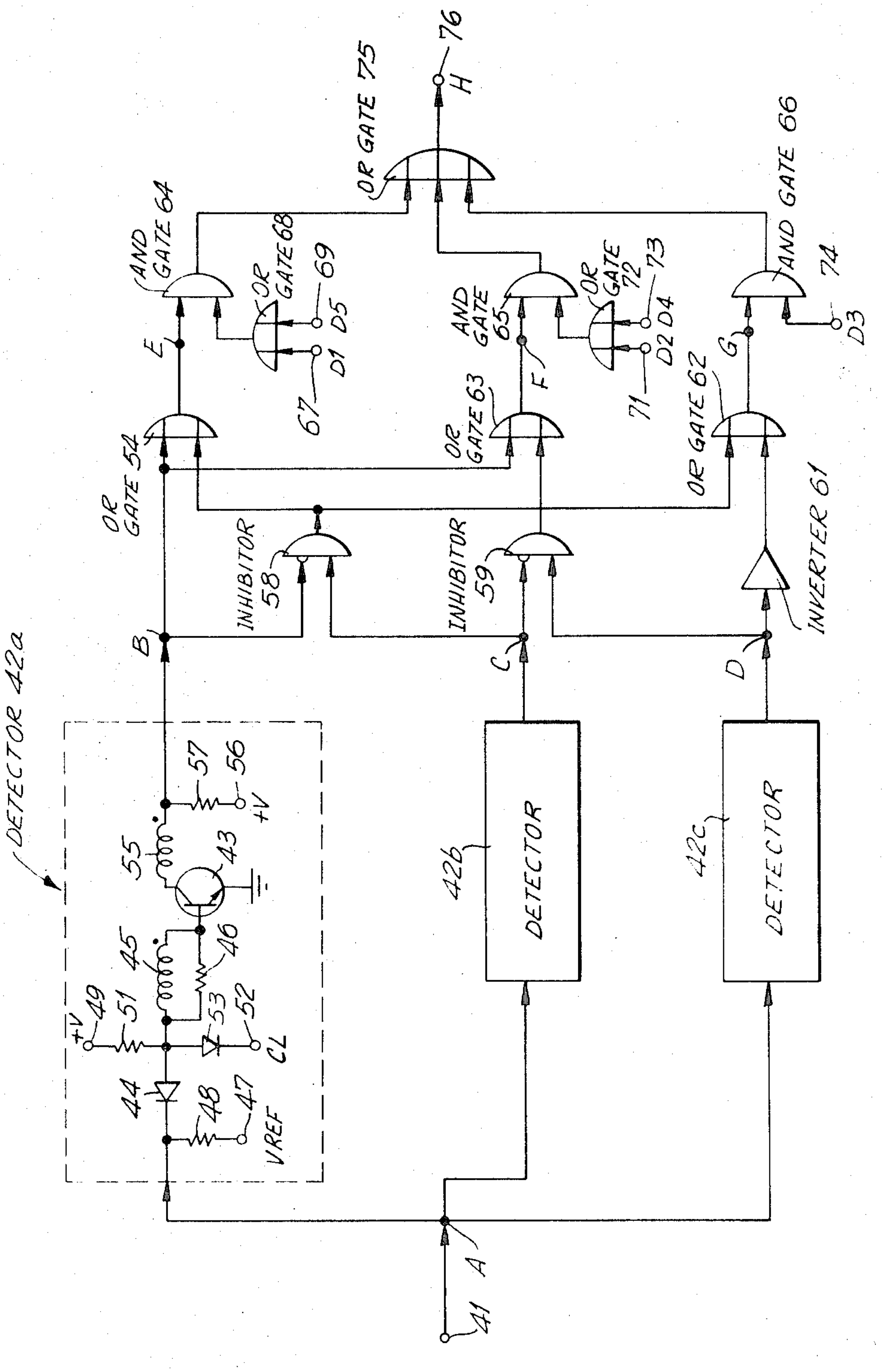
FIG. 4 is a block and circuit diagram of an embodiment of a regenerative repeater of the system of the present invention.
Figure 5:
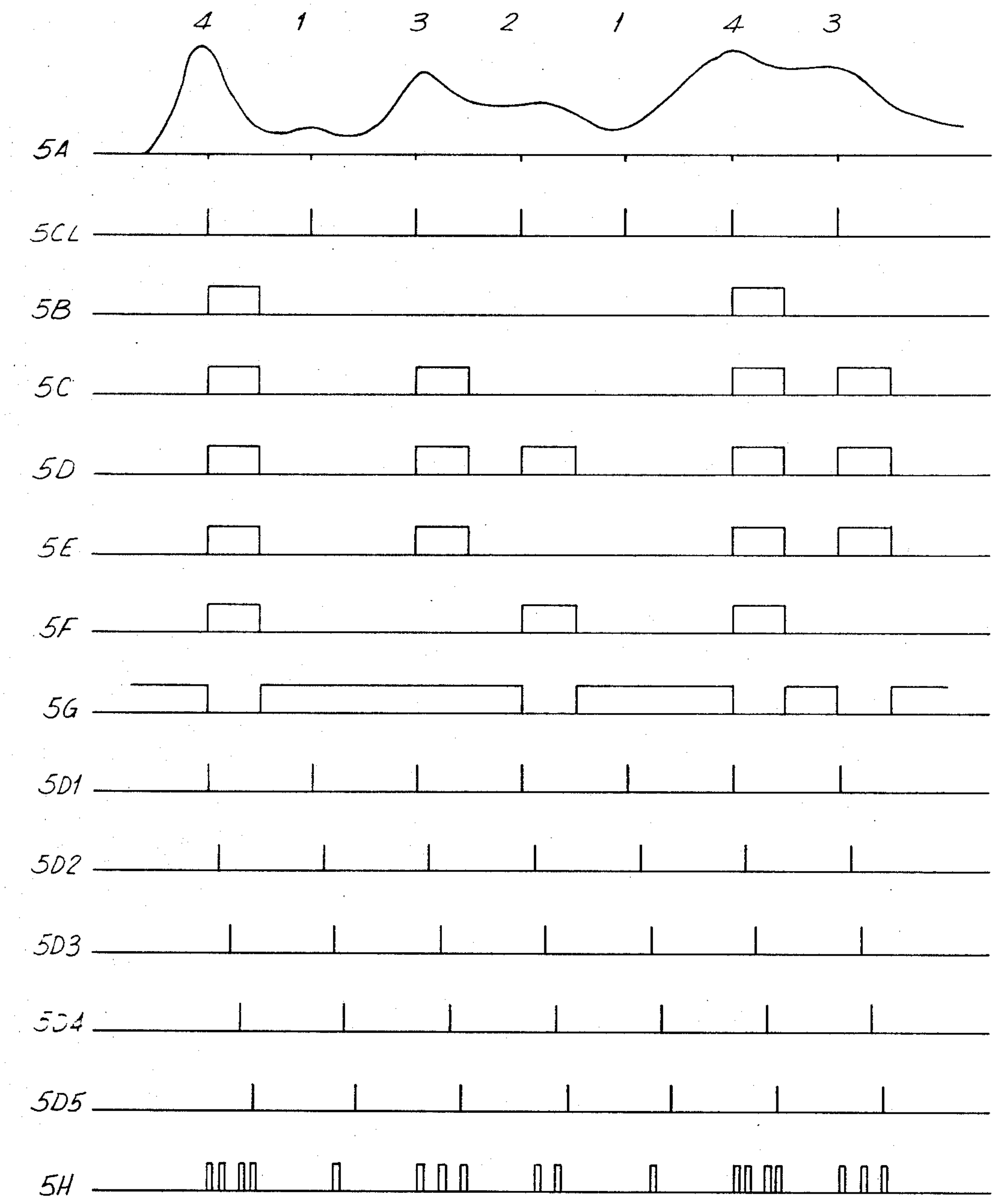
FIG. 5 is a graphical presentation of the waveforms appearing in the circuit of FIG. 4.

FIG. 4 illustrates an embodiment of the regenerative repeater of the system of the present invention. FIG. 5 comprises a plurality of waveforms illustrating the operation of the circuit of FIG. 4. The waveforms of FIG. 5 are 5A, 5CL, 5B, 5C, 5D, 5E, 5F, 5G, 5D1, 5D2, 5D3, 5D4, 5D5 and 5H.

In FIG. 4, a group of pulses transmitted by a transmission line is integrated by the frequency characteristic of the transmission line and the frequency characteristic of an equalizing amplifier in the preceding stage (not shown in the FIGS.) of the regenerative repeater. The waveform 5A of FIG. 5, which is a multilevel waveform, is supplied to an input terminal 41 of the regenerative repeater of FIG. 4. The waveform 5A of FIG. 5 is supplied in common to the inputs of detectors **42*a*, 42*b* and 42*c*. The detectors 42*a*, 42*b* and 42*c*** have different threshold levels.

Three detectors, **42*a*, 42*b* and 42*c*, are utilized in the embodiment of FIG. 4** because the regenerative repeater utilizes a four level system. The number of detectors required in an *n* level system is *n*—1. If the four level system is made 4, 3, 2 and 1, the threshold level of the detector **42*a* is selected at 3.5, the threshold level of the detector 42*b* is selected at 2.5 and the threshold level of the detector 42*c*** is selected at 1.5. The threshold level is determined by VREF.

Each of the detectors **42*a*, 42*b* and 42*c* has the same circuit so that only the circuit of the detector 42*a* is shown. The waveform 5A of FIG. 5 is supplied to the base electrode of a transistor 43 via a diode 44 and an inductor 45 connected in series circuit arrangement. A resistor 46 is connected in shunt across the inductor 45. An input terminal 47 is connected to a common point in the connection between the input terminal 41 and the diode 44 via a resistor 48. An input terminal 49 is connected to a common point in the connection between the diode 44 and the inductor 45 via a resistor 51 and an input terminal 52 is connected to said common point via a diode 53. The emitter electrode of the transistor 43** is connected to a point at ground potential.

The collector electrode of the transistor 43 is connected to an input of an OR gate 54 via an inductor 55. An input terminal 56 is connected to a common point in the connection between the inductor 55 and the OR gate 54 via a resistor 57. The OR gate 54 is not part of the detector **42*a*. The inductor 55 is also connected to an input of an inhibitor 58. The output of the detector 42*b* is connected in common to the other input of the inhibitor 58 and an input of an inhibitor 59. The output of the detector 42*c* is connected in common to the other input of the inhibitor 59 and to the input of an inverter 61**.

The output of the inhibitor 58 is connected in common to the other input of the OR gate 54 and an input of an OR gate 62. The output of the inhibitor 59 is connected to an input of an OR Gate 63. The output of the inverter 61 is connected to the other input of the OR gate 62. The output of the detector **42*a* is also connected to the other input of the OR gate 63. The output of the OR gate 54 is connected to an input of an AND gate 64. The output of the OR gate 63 is connected to an input of an AND gate 65. The output of the OR gate 62 is connected to an input of an AND gate 66**.

An input terminal 67 is connected to an input of an OR gate 68 and an input terminal 69 is connected to the other input of said OR gate. The output of the OR gate 68 is connected to the other input of the AND gate 64. An input terminal 71 is connected to an input of an OR gate 72 and an input terminal 73 is connected to the other input of said OR gate. The output of the OR gate 72 is connected to the other input of the AND gate 65. An input terminal 74 is connected to the other input of the AND gate 66. The output of the AND gate 64 is connected to an input of an OR gate 75. The output of the AND gate 65 is connected to a second input of the OR gate 75. The output of the AND gate 66 is connected to the third input of the OR gate 75. The output of the OR gate 75 is connected to an output terminal 76.

If the level of the input signal 5A of FIG. 5 is lower than the reference level VREF supplied to the input terminal 47, the diode 44 is switched to its conductive condition. The blocking oscillator circuit, which includes the transistor 43, is not operated. If the level of the input signal 5A is greater than the reference level VREF applied to the input terminal 47, the diode 44 is switched to its non-conductive condition and the transistor 43 is switched to its conductive condition. The blocking oscillator is then operated and produces pulses having the waveform 5B of FIG. 5. Although the detectors **42*b* and 42*c* are the same in structure and operation as the detector 42*a***, each of said detectors has a different threshold level.

Each of the circuit points A, B, C, D, E, F, G and H of FIG. 4 corresponds to the corresponding waveform 5A, 5B, 5C, 5D, 5E, 5F, 5G and 5H of FIG. 5. The inhibitors or inhibit gates 58 and 59, the inverter 61, and the OR gates 54, 63 and 62 produce the waveforms 5E, 5F and 5G of FIG. 5. The group of regenerated pulse waveforms 5H of FIG. 5 is provided at the output terminal 76 when the AND gates 64, 65 and 66 are switched to their conductive condition by the digit pulses D1 and D5, supplied to the input terminals 67 and 69, respectively, D2 and D4, supplied to the input terminals 71 and 73, respectively, and D3, supplied to the input terminal 74.

Figure 6:
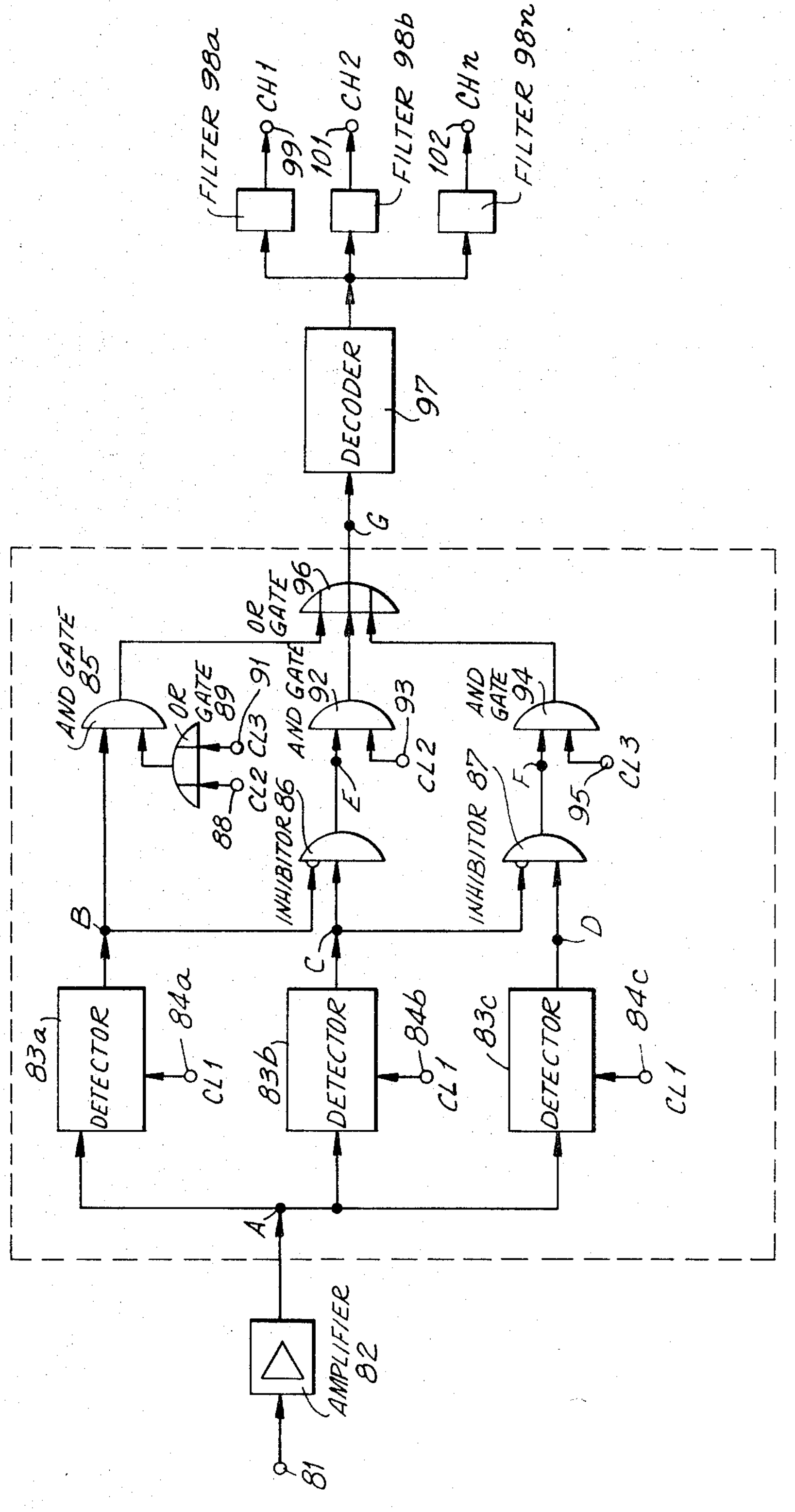
FIG. 6 is a block and circuit diagram of an embodiment of a receiver of the system of the present invention.
Figure 7:
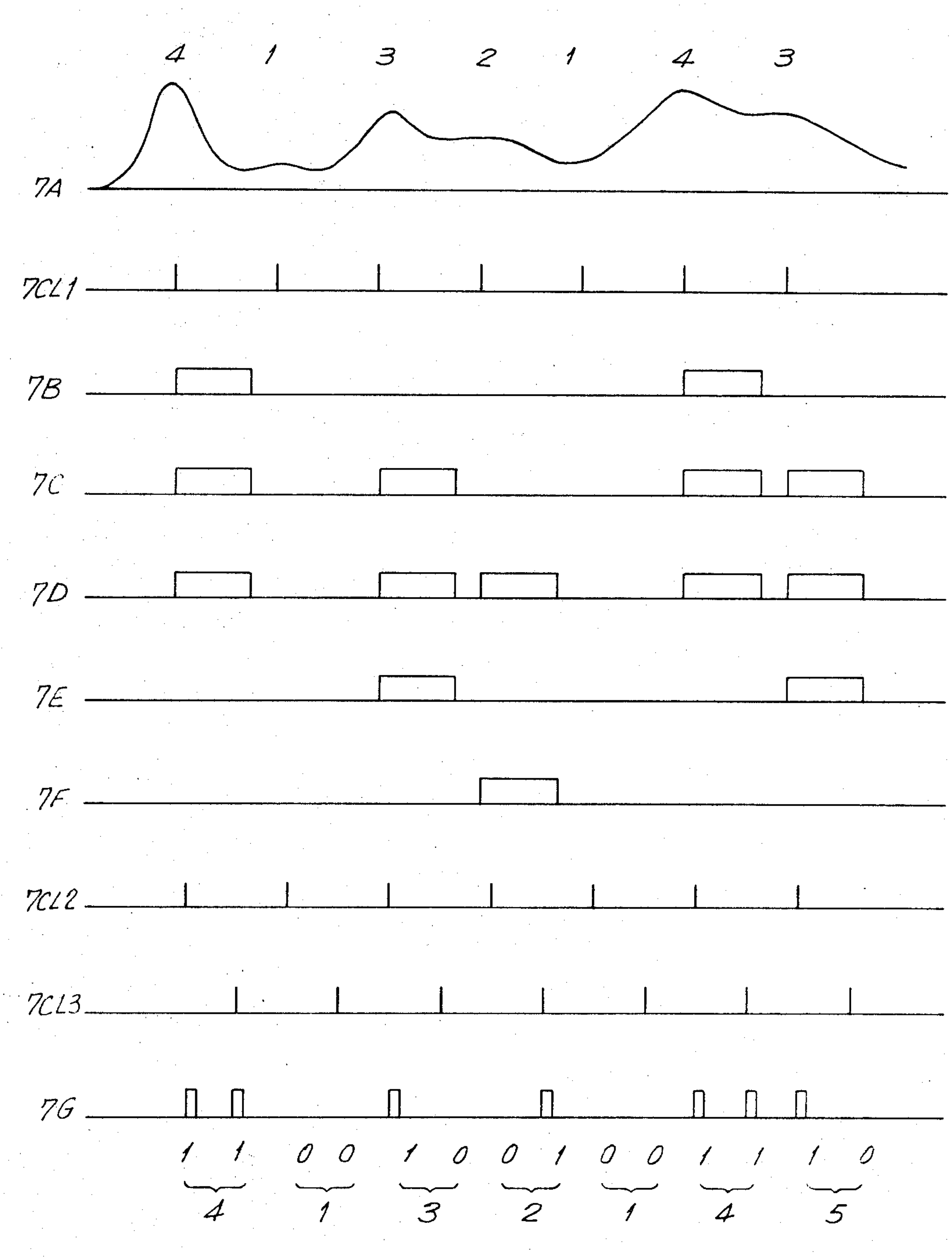
FIG. 7 is a graphical presentation of the waveforms appearing in the circuit of FIG. 6.

FIG. 6 illustrates a receiver of the system of the present invention. FIG. 7 illustrates the waveforms 7A, 7CL1, 7B, 7C, 7D, 7E, 7F, 7CL2, 7CL3 and 7G appearing in the circuit of FIG. 6. Each of the waveforms 7A, 7B, 7C, 7D, 7E, 7F and 7G appears at a corresponding one of the circuit points A, B, C, D, E, F and G of FIG. 6.

The received signals are supplied to an input terminal 81 of FIG. 6. The input terminal 81 is connected to the input of an amplifier 82. The output of the amplifier is connected in common to the input of each of a plurality of detectors 83*a*, 83*b* and 83*c*. An input terminal 84*a* is connected to the detector 83*a*. An input terminal 84*b* is connected to the detector 83*b*. An input terminal 84*c* is connected to the detector 83*c*.

The output of the detector 83*a* is connected in common to an input of an AND gate 85 and to an input of an inhibitor 86. The output of the detector 83b is connected in common to the other input of the inhibitor 86 and to an input of an inhibitor 87. The output of the detector 83*c* is connected to the other input of the inhibitor 87. An input terminal 88 is connected to an input of an OR gate 89 and an input terminal 91 is connected to the other input of said OR gate. The output of the OR gate 89 is connected to the other input of the AND gate 85.

The output of the inhibitor 86 is connected to an input of an AND gate 92. An input terminal 93 is connected to the other input of the AND gate 92. The output of the inhibitor 87 is connected to an input of an AND gate 94. An input terminal 95 is connected to the other input of the AND gate 94. The output of the AND gate 95 is connected to an input of an OR gate 96. The output of the AND gate 92 is connected to a second input of the OR gate 96. The output of the AND gate 94 is connected to the third input of the OR gate 96. The output of the OR gate 96 is connected to the input of a decoder 97. The output of the decoder 97 is connected in common to the input of each of a plurality of filters 98*a*, 98*b*, . . . 98*n*. An output terminal 99 is connected to the output of the filter 98*a* and provides channel 1 information. An output terminal 101 is connected to the output of the filter 98*b* and provides channel 2 information. An output terminal 102 is connected to the output of the filter 98*n* and provides channel *n* information.

The received signals, supplied to the input terminal 81, are equalized by the equalizing amplifier 82 and are converted to the waveform 7A of FIG. 7. Each of the detectors 83*a*, 83*b* and 83*c* is the same as the detectors of FIG. 4. The detector 83*a* produces the output waveform 7B of FIG. 7. The detector 83*b* produces the output waveform 7C of FIG. 7. The detector 83*c* produces the output waveform 7D of FIG. 7.

The output waveforms 7B, 7C and 7D are converted into ordinary binary PCM pulses 7G of FIG. 7 by the inhibitors or inhibit gates 86 and 87, the AND gates 85, 92 and 94 and the OR gates 89 and 96. The binary PCM pulses are converted into PAM pulses by the decoder 97. The PAM pulses are demultiplexed and reconverted to ordinary audio signals by the low pass filters 98*a*, 98*b*, . . . 98*n*.

Although, for the purposes of illustration, the embodiments of the system of the present invention have been described as utilizing quaternary or four level codes, a multilevel code may be utilized, as long as it is above ternary level. Also, bipolar pulses may be transmitted, although unipolar pulses are transmitted in the aforedescribed embodiments. In such case, of course, the number of pulses is increased relative to the number of unipolar pulses. Furthermore, in the system of the present invention, unipolar or bipolar pulses may not only be utilized without modification, but such pulses may be utilized after conversion into pulses of a type suitable for transmission. Although a transmitter, a regenerative repeater and a receiver utilizing the system of the present invention, have been described, it is not necessary to apply the invention to each of said transmitter, regenerative repeater and receiver. It is possible, for example, to transmit known multilevel codes from the transmitter and to utilize the system of the present invention only in the repeater. Thus, in accordance with the present invention, multilevel signals may be transmitted without the utilization of a waveform regenerating circuit for regenerating multilevel amplitude signals.

Table I illustrates the minimum number of pulses constituting a series pulse train necessary for an *n* level code and the number of possible combinations of a group of series pulses constituted by such minimum number of pulses.

Table I

| Code | Discriminated level | Number of pulses constituting a series code train | Total number of combinations |
|---|---|---|---|
| 1, 0 | $n$ | $n-1$ | $2^{n-1}$ |
| +1, 0, −1 | $n$ (odd number) | $n-1/2$ | $_3n^{-1/2}$ |
| +1, 0, −1 | $n$ (even number) | $n-1$ | $3^{n-1}$ |

In the system of the present invention, as seen from Table I, it is necessary that the number of pulses corresponding to the *n* level system be greater than $n-1$ and the number of combinations of the pulse train be very great. Therefore, by proper selection of the pattern of the transmitted pulses, it is possible to utilize a pulse train having little intersymbol interference, little timing jitter, and excellent transmission efficiency. Furthermore, the necessary equipment may be constructed and assembled with considerable facility.

Figure 8:
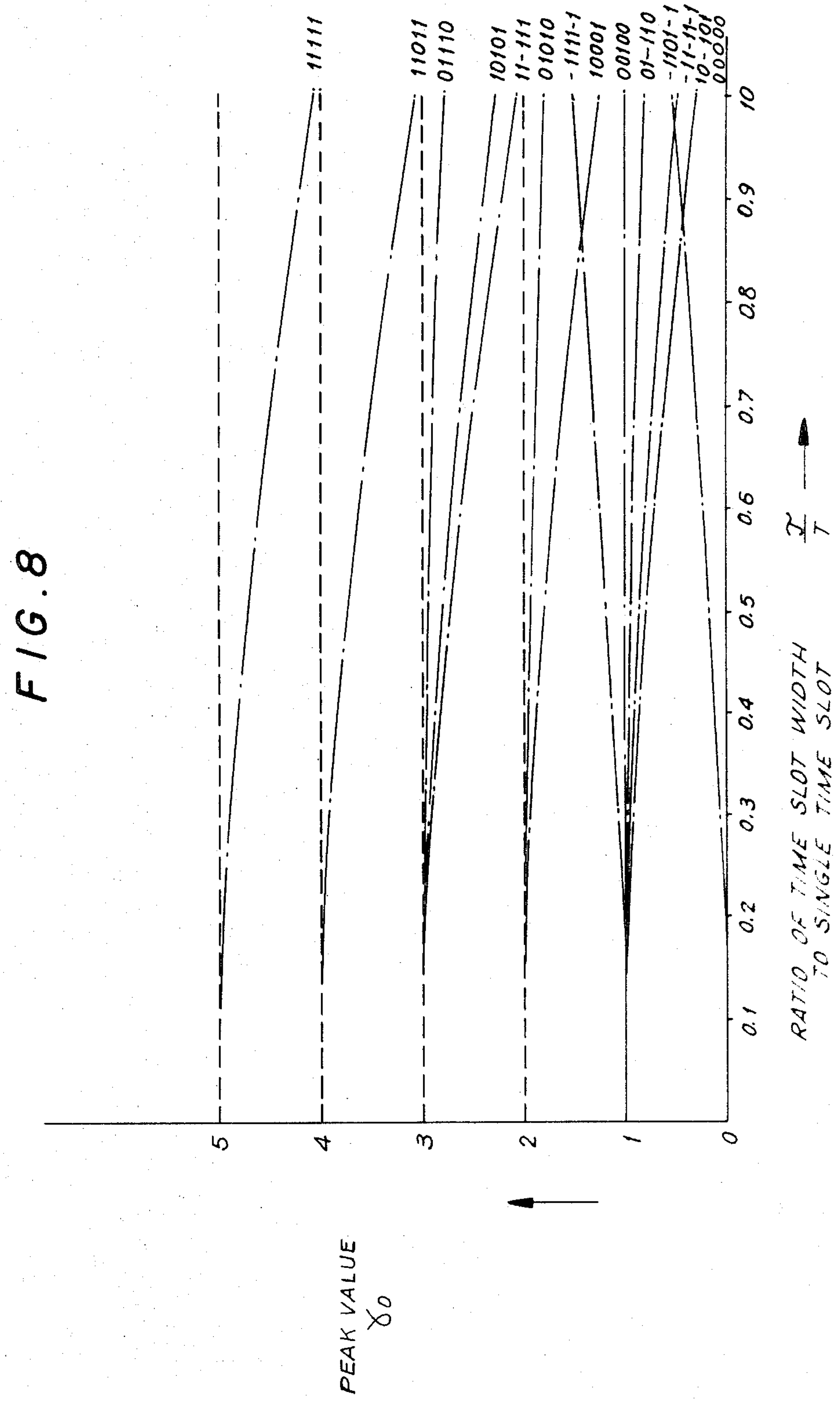
FIG. 8 is a graphical presentation of illustrating the operation of the system of the present invention.

In the system of the present invention, from the viewpoint intersymbol interference, as seen from FIG. 8, it is more desirable that the ratio $\tau$/T of the width of the time slot occupied by the transmitted pulses and a single time slot be smaller. From the viewpoint of realization of the system, however, it is more desirable that the ratio $\tau$/T be larger. Therefore, the ratio $\tau$/T must be properly determined, in consideration of these factors. In FIG. 8, the abscissa represents the ratio $\tau$/T of the width of the time slot to a single time slot. The ordinate represents the peak values $\gamma$0 of the qualified waveforms.

Figure 9:
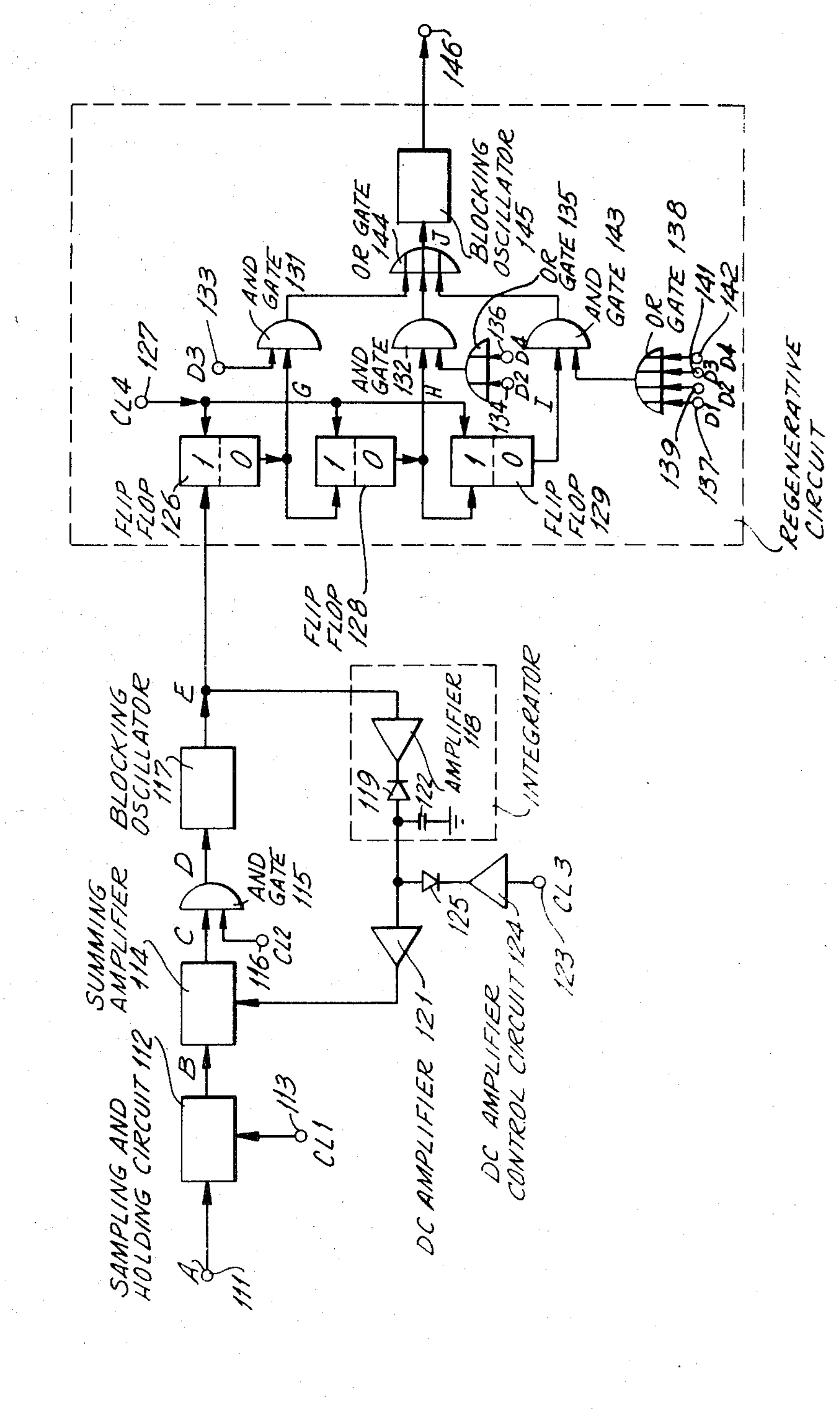
FIG. 9 is a block and circuit diagram of another embodiment of a regenerative repeater of the system of the present invention.
Figure 10:
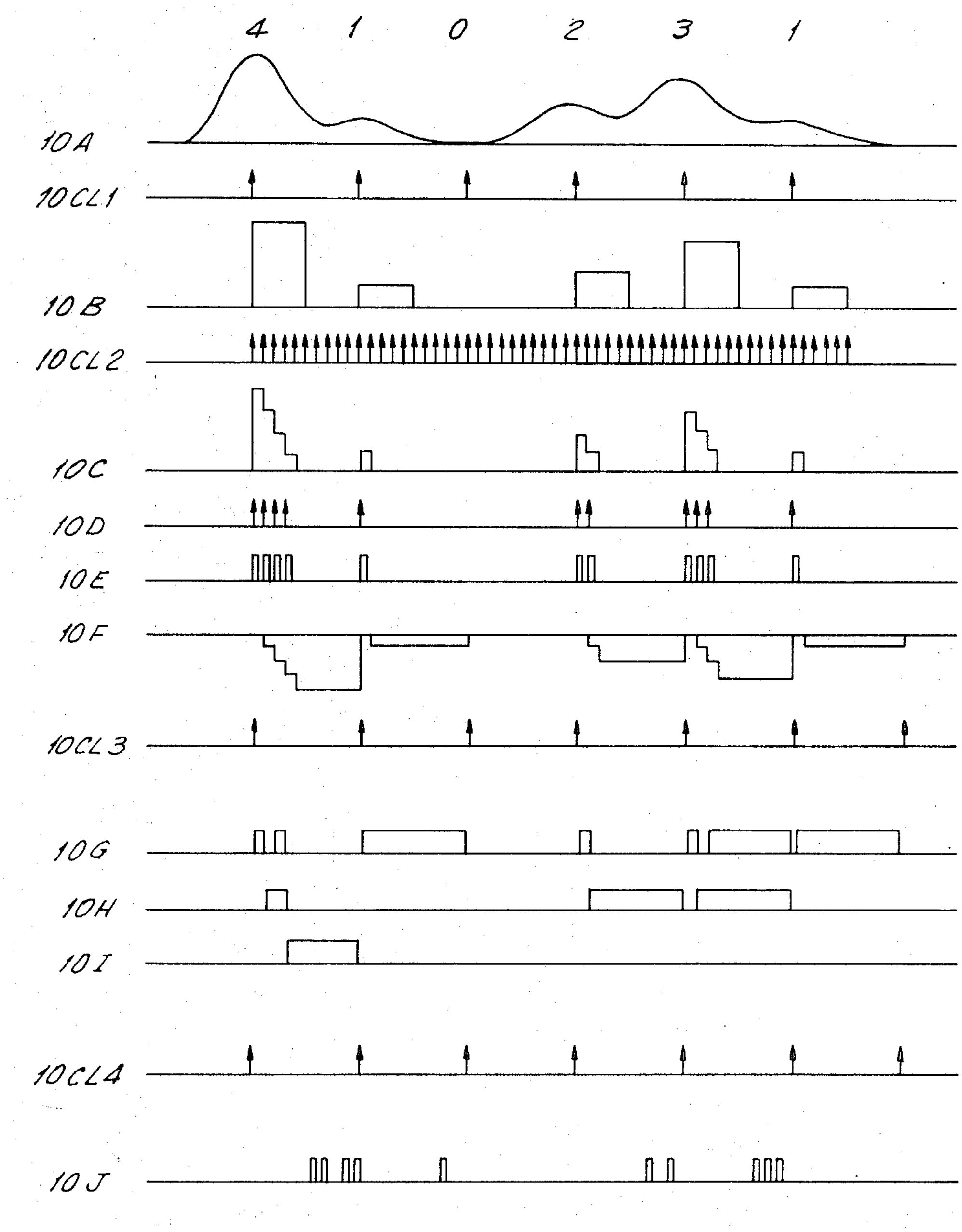
FIG. 10 is a graphical presentation of the waveforms appearing in the circuit of FIG. 9.

FIG. 9 illustrates another embodiment of a regenerative repeater of the present invention. The embodiment of FIG. 9 utilizes quinary or five level signals. In the embodiment of FIG. 9, only a single detector or discriminator is utilized. FIG. 10 illustrates the waveforms 10A, 10CL1, 10B, 10CL2, 10C, 10D, 10E, 10F, 10CL3, 10G, 10H, 10I, 10CL4 and 10J, appearing at the corresponding points of the circuit of FIG. 9.

IN FIG. 9, the input waveform 10A of FIG. 10 is supplied to an input terminal 111. The input terminal 111 is connected to the input of a sampling and holding circuit 112. An input terminal 113 is connected to the sampling and holding circuit 112. The output of the sampling and holding circuit 112 is connected to an input of a summing amplifier 114. The output of the summing amplifier 114 is connected to an input of an AND gate 115. An input terminal 116 is connected to the other input of the AND gate 115. The output of the AND gate 115 is connected to the input of a blocking oscillator 117.

The output of the blocking oscillator 117 is connected, via a feedback path, to another input of the summing amplifier 114. The feedback path comprises an amplifier 118, a diode 119 and a DC amplifier 121 connected in series circuit arrangement. A capacitor 122 is connected between a common point in the connection between the diode 119 and the DC amplifier 121 and a point at ground potential. An input terminal 123 is connected to a common point in the connection between the diode 119 and the DC amplifier 121 via a DC amplifier control circuit 124 and a diode 125 connected in series circuit arrangement with said DC amplifier control circuit. The amplifier 118, the diode 119 and the capacitor 122 function as an integrator.

The output of the blocking oscillator 117 is also connected to an input of a flip flop 126. An input terminal 127 is connected to another input of the flip flop 126, to an input of a flip flop 128 and to an input of a flip flop 129. The output of the flip flop 126 is connected in common to an input of an AND gate 131 and another input of the flip flop 128. The output of the flip flop 128 is connected in common to an input of an AND gate 132 and to another input of the flip flop 129. An input terminal 133 is connected to the other input of the AND gate 131.

An input terminal 134 is connected to an input of an OR gate 135 and an input terminal 136 is connected to the other input of said OR gate. The output of the OR gate 135 is connected to the other input of the AND gate 132. An input terminal 137 is connected to a first input of an OR gate 138, an input terminal 139 is connected to a second input of said OR gate, an input terminal 141 is connected to a third input of said OR gate, and an input terminal 142 is connected to the fourth input of said OR gate. The output of the OR gate 138 is connected to an input of an AND gate 143. The output of the flip flop 129 is connected to the other input of the AND gate 143. The output of the AND gate 131 is connected to an input of an OR gate 144. The output of the AND gate 132 is connected to a second input of the OR gate 144. The output of the AND gate 143 is connected to the third input of the OR gate 144. The output of the OR gate 144 is connected to the input of a blocking oscillator 145. An output terminal 146 is connected to the output of the blocking oscillator 145.

As shown in FIG. 8, when multilevel signals have been distorted and attenuated in the transmission line and are supplied to or received by the regenerative repeater, the waveforms of such signals are provided at the equalizing amplifier. The output waveforms of the equalizing amplifier are the equalized waveforms. Quinary or five level equalized waveforms have an amplitude equivalent of five levels.

The equalized waveforms 10A of FIG. 10 are supplied to the input terminal 111 of FIG. 9. The sampling and holding circuit 112 samples the central level or magnitude of the equalized waveforms 10A of FIG. 10 with a timing signal or clock signal CL1 supplied to the input terminal 113. The clock signal 10CL1 has a repetition frequency *f*. The repetition frequency *f* of the clock signal CL1, having the waveform 10CL1 of FIG. 10, is the frequency of the signals to be transmitted. The sampling and holding circuit 112 holds or stores the magnitude or level for a specific period of time. Such period of time must be less than one time slot $1/f$ and is actually selected at approximately $1/2f$.

The summing amplifier 114 amplifies and add the signals comprising the waveforms 10B and 10F supplied thereto. The waveform 10F of FIG. 10 is the output waveform or a DC amplifier. The operation is such that the polarity of one input of the summing amplifier 114 may be opposite that of the other. The output waveform 10F of the DC amplifier is controlled by the DC amplifier control circuit 124, so that said output waveform is always zero at the beginning of each time slot. The waveform 10C of FIG. 10 is the output of the summing amplifier 114 and is transferred by the AND gate 115 which is switched to its conductive condition by the clock pulses CL2 supplied to the input terminal 116.

The blocking oscillator 117 functions as a pulse generator, and is driven by the waveform 10D of FIG. 10, which is the output of the AND gate 115. The blocking oscillator 117 produces the waveform pulses 10E of FIG. 10. The pulses 10E have a duty ratio of about 1/2 and are produced by the repetition of the clock pulses CL2. The pulses 10E function to drive the regenerative circuit enclosed by the broken lines, and are integrated by the integrator in the feedback path between the blocking oscillator 117 and the summing amplifier 114.

The integrator 118, 119, 122 of the feedback path derives the DC component from the pulses 10E and supplies the derived DC component to the DC amplifier 121. The DC amplifier 121 produces a level equivalent to the multilevel 1. The signals 10F are then added to the signals 10B, again, in the aforedescribed manner, and the operation is repeated in the holding time. Thus, a series of *n* pulses is produced by the pulse generating circuit or blocking oscillator 117.

If it is assumed, for example, that a signal having a magnitude or level of 4 is supplied to the input terminal 111 of FIG. 9, said signal is first compared with a signal having a magnitude or level of 0, as shown in the waveform 10F of FIG. 10. Since the input signal is greater than 0, a single pulse is produced, and said signal is compared with a level or magnitude of 1. Another pulse is produced and the signal is then compared with a signal having a level or magnitude of 2. Another pulse is produced as a result of such comparison. Finally, the signal is compared with a signal having a magnitude or level of 3 and another pulse is produced. All four pulses are produced by the pulse generating circuit or blocking oscillator 117 and are illustrated in the waveform 10E of FIG. 10. Similarly, if an input signal having a magnitude or level of 3 is supplied to the input terminal 111, three pulses are produced, and if a signal having a magnitude or level of 2 is supplied, two pulses are produced. Of course, if a signal having a magnitude or level of 1 is supplied to the input terminal 111, a single pulse is produced, and if a signal having a magnitude of 0 is supplied, no pulse is produced.

The aforedescribed pulses produced by the blocking oscillator or pulse generating circuit 117 are supplied to the regenerative circuit in FIG. 9. The regenerative circuit comprises a counter constituted by the three flip flops 126, 128 and 129. The three flip flops 126, 128 and 129 are controlled by the clock signals CL4, illustrated in the waveform 10CL4 of FIG. 10. The digit signals D1, D2, D3, D4 and D5 supplied to the inputs of the AND gates 131, 132 and 143, control the transfer of the pulses to the blocking oscillator 145 via said AND gates.

While the invention has been described by means of specific examples and in specific embodiments, we do not wish to be limited thereto, for obvious modifications will occur to those skilled in the art without departing from the spirit and scope of the invention.

We claim:

1. A system for transmitting multilevel digital signals to a repeater or receiver comprising
   converting means for converting said multilevel digital signals into groups of bipolar or unipolar series pulses;
   input means connected to said converting means for supplying said multilevel digital signals to said converting means;
   transmitter means including a transmission line coupled to said converting means for transmitting said groups of bipolar or unipolar series pulses; and
   receiver means for receiving the transmitted pulses, each pulse of which has a value corresponding to the multilevel.

2. A regenerative repeater for regenerating groups of bipolar or unipolar series pulses, comprising
   equalizing means for equalizing and amplifying transmitted pulses, each pulse of which has a value corresponding to the multilevel;
   input means connected to said equalizing means for supplying said transmitted pulses;
   detecting means coupled to said equalizing means and comprising a plurality of detectors for detecting the levels of the equalized and amplified transmitted pulses;
   converting means coupled to said detecting means for converting the detected transmitted pulses into groups of bipolar or unipolar series pulses, each group of which has a value corresponding to the multilevel and being integrated by the frequency characteristic of the transmission line via which the pulses are transmitted; and
   output means connected to said converting means for deriving said groups of bipolar or unipolar series pulses.

3. A regenerative repeater for regenerating groups of bipolar or unipolar series pulses, comprising
   equalizing means for equalizing and amplifying transmitted pulses, each pulse of which has a value corresponding to the multilevel;
   input means connected to said equalizing means for supplying said transmitted pulses;

reference voltage means for providing a reference voltage having a reference level;
   comparing means connected to said equalizing means and said reference voltage means for comparing the levels of said reference voltage and the equalized and amplified transmitted pulses, said comparing means providing a single pulse of groups of bipolar or unipolar series pulses in accordance with the comparison; and
   coupling means connected between said comparing means and said reference voltage means for modifying the magnitude of said reference level in accordance with said single pulse.

4. A method of transmitting multilevel digital signals to a repeater or receiver comprising the steps of
   converting said multilevel digital signals into groups of bipolar or unipolar series pulses;
   transmitting said groups of bipolar or unipolar series pulses; and
   receiving the transmitted pulses, each pulse of which has a value corresponding to the multilevel.

5. A method of regenerating groups of bipolar or unipolar series pulses, comprising the steps of
   equalizing and amplifying transmitted pulses, each pulse of which has a value corresponding to the multilevel;
   detecting the levels of the equalized and amplified transmitted pulses;
   converting the detected transmitted pulses into groups of bipolar or unipolar series pulses, each group of which has a value corresponding to the multilevel and being integrated by the frequency characteristic of the transmission line via which the pulses are transmitted; and
   deriving said groups of bipolar or unipolar series pulses.

6. A method of regenerating groups of bipolar or unipolar series pulses, comprising the steps of
   equalizing and amplifying transmitted pulses, each pulse of which has a value corresponding to the multilevel;
   providing a reference voltage having a reference level;
   comparing the levels of the reference voltage and the equalized and amplified transmitted pulses;
   providing a single pulse of groups of bipolar or unipolar series pulses in accordance with the comparison; and
   modifying the magnitude of the reference level in accordance with the single pulse.

* * * * *